United States Patent
Masuda et al.

(10) Patent No.: US 9,382,121 B2
(45) Date of Patent: Jul. 5, 2016

(54) SILICON CARBIDE POWDER AND METHOD FOR PRODUCING SAME

(75) Inventors: Kenta Masuda, Chiba (JP); Kouki Ichitsubo, Chiba (JP); Kohei Kawano, Chiba (JP); Masakazu Suzuki, Chiba (JP); Jun Kumasaka, Chiba (JP); Hideaki Tanaka, Kagoshima (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 0 days.

(21) Appl. No.: 14/239,555

(22) PCT Filed: Aug. 23, 2012

(86) PCT No.: PCT/JP2012/071270
§ 371 (c)(1),
(2), (4) Date: May 23, 2014

(87) PCT Pub. No.: WO2013/027790
PCT Pub. Date: Feb. 28, 2013

(65) Prior Publication Data
US 2014/0301933 A1 Oct. 9, 2014

(30) Foreign Application Priority Data
Aug. 24, 2011 (JP) .................... 2011-182933

(51) Int. Cl.
*C04B 2/00* (2006.01)
*C04B 7/00* (2006.01)
(Continued)

(52) U.S. Cl.
CPC ................ *C01B 31/36* (2013.01); *B82Y 30/00* (2013.01); *C04B 35/573* (2013.01);
(Continued)

(58) Field of Classification Search
CPC .... C01B 31/36; C01P 2006/80; C30B 25/005
See application file for complete search history.

(56) References Cited

U.S. PATENT DOCUMENTS 4,141,740 A * 2/1979 Cutler .................. C04B 35/111
501/89
4,419,336 A * 12/1983 Kuriakose ............... C01B 31/36
423/345

(Continued)

FOREIGN PATENT DOCUMENTS

JP 58-48487 B2 10/1983
JP 62-027316 A 2/1987
(Continued)

OTHER PUBLICATIONS

International Preliminary Report on Patentability and Written Opinion from the International Searching Authority mailed on Feb. 25, 2014 for the corresponding international application No. PCT/JP2012/071270 (English translation).

*Primary Examiner* — Guinever S Gregorio
(74) *Attorney, Agent, or Firm* — Posz Law Group, PLC

(57) ABSTRACT

A high-purity silicon carbide powder and its production method enable mass production of the high-purity silicon carbide powder at low cost in a safe manner. The content of impurities in the silicon carbide powder is 500 ppm or less. The silicon carbide powder can be obtained by heating a raw material for silicon carbide production in an Acheson furnace using a heat generator. The raw material for silicon carbide production is prepared by mixing a siliceous raw material and a carbonaceous raw material. The raw material for silicon carbide production contains the siliceous raw material and the carbonaceous raw material at a mixture mole ratio ($C/SiO_2$) of 2.5 to 4.0 and has a content of impurities of 120 ppm or less.

7 Claims, 1 Drawing Sheet

(51) Int. Cl.
  *C04B 14/00* (2006.01)
  *C04B 22/00* (2006.01)
  *C04B 26/00* (2006.01)
  *C04B 33/00* (2006.01)
  *C04B 103/00* (2006.01)
  *B82Y 30/00* (2011.01)
  *C01B 31/36* (2006.01)
  *C04B 35/573* (2006.01)
  *C04B 35/626* (2006.01)
(52) U.S. Cl.
  CPC .. *C04B 35/62695* (2013.01); *C04B 2235/3418* (2013.01); *C04B 2235/422* (2013.01); *C04B 2235/424* (2013.01); *C04B 2235/425* (2013.01); *C04B 2235/549* (2013.01); *C04B 2235/5427* (2013.01); *C04B 2235/5454* (2013.01); *C04B 2235/72* (2013.01); *C04B 2235/727* (2013.01)

(56) References Cited

U.S. PATENT DOCUMENTS

| | | | | |
|---|---|---|---|---|
| 4,702,900 | A | * | 10/1987 | Kurachi et al. ............ 423/345 |
| 6,022,515 | A | * | 2/2000 | Støle et al. ............... 423/345 |
| 6,632,761 | B1 | * | 10/2003 | Ushita ................... C01B 31/36 |
| | | | | 252/516 |
| 2011/0097256 | A1 | * | 4/2011 | Pizzini ..................... 423/349 |
| 2011/0175024 | A1 | | 7/2011 | Lang et al. |

FOREIGN PATENT DOCUMENTS

| | | |
|---|---|---|
| JP | 63-62449 B2 | 12/1988 |
| JP | 64-061308 A | 3/1989 |
| JP | 04-270106 A | 9/1992 |
| JP | 4006716 B2 | 9/2007 |
| WO | 2010/037692 A1 | 4/2010 |

* cited by examiner

SILICON CARBIDE POWDER AND METHOD FOR PRODUCING SAME

CROSS REFERENCE TO RELATED APPLICATIONS

This application is a U.S. national stage application of PCT/JP2012/0071270 filed on Aug 23, 2012, and claims priority to, and incorporates by reference, Japanese Patent Application No. 2011-182933 filed on Aug. 24, 2011.

TECHNICAL FIELD

The present invention relates to a high-purity silicon carbide powder obtained by the use of an Acheson furnace and a method of producing the silicon carbide powder.

BACKGROUND ART

Silicon carbide (SiC) has been widely used as industrial materials including polishing or abrasive materials, ceramics sintered materials, and conductive materials. In recent years, awareness about energy conservation and utilization of natural renewable energy while abandoning nuclear power generation among people has been higher than before. Because of such social background, there is a demand for a high-purity silicon carbide powder which can be used as monocrystalline materials for power semiconductors.

As a technique of mass-producing silicon carbide in an industrial scale, there has been known a method of using a siliceous raw material containing silicon (Si) (for example, silica sand) and a carbonaceous raw material containing carbon (for example, petroleum coke) as raw materials and heating the materials at 1,600° C. or more by using an Acheson furnace, thereby producing silicon carbide by means of a direct reduction reaction.

A high-purity silicon carbide powder cannot be obtained by the conventional production methods using an Acheson furnace, because impurities are contained at a high content in raw materials and it is difficult to control the impurities.

Therefore, there have been proposed various methods of upgrading the purity of a low-purity silicon carbide powder. For example, Patent Literature 1 discloses a method of producing a high-purity silicon carbide powder, the method including providing a silicon carbide powder containing impurities at high contents in a vacuum vessel and heating the powder at a vacuum degree of $9\times10^{-5}$ to $1\times10^{-2}$ torr and a temperature of 1,500 to 1,700° C., thereby removing the impurities contained in the silicon carbide powder.

However, the method disclosed in Patent Literature 1 which has a step of heating in vacuum requires complex devices and high-cost, and does not allow for mass production at one time in an industrial scale.

Patent Literature 2 discloses a method of producing a high-purity silicon carbide powder, the method including introducing a mixture of a silicon carbide powder containing impurities at high contents and hydrofluoric acid into a sealed container and heating the mixture under increased pressure.

However, there are problems in that hydrofluoric acid is difficult to handle because it is harmful to humans and hazardous, and in that the method disclosed in Patent Literature 2 does not allow for mass processing of the silicon carbide powder in an industrial scale.

CITATION LIST

Patent Literatures

[Patent Literature 1] JP S64-61308 A
[Patent Literature 2] JP 4006716 B2

SUMMARY OF THE INVENTION

Problems to be Solved by the Invention

An object of the present invention is to provide a high-purity silicon carbide powder and a production method enabling mass production of the high-purity silicon carbide powder in a safe manner at low cost.

Means for Solving the Problem

As a result of diligent study aiming at solving the above-described problems, the present inventor perfected the present invention upon discovering the fact that the above-described object can be achieved by a specific silicon carbide powder and its production method. The specific silicon carbide powder is obtained by firing (i.e. heating), in an Acheson furnace, a raw material for silicon carbide production prepared by mixing a siliceous raw material and a carbonaceous raw material.

That is, the present invention provides the following items [1] to [6].

[1] A silicon carbide powder obtained by firing a raw material for silicon carbide production, which is a mixture of a siliceous raw material and a carbonaceous raw material, in an Acheson furnace, wherein the content of impurities in the silicon carbide powder is 500 ppm or less.

[2] A method of producing the silicon carbide powder according to the above-mentioned item [1], comprising using a material, which contains the carbonaceous raw material and the siliceous raw material at a mixture mole ratio ($C/SiO_2$) of 2.5 to 4.0 and which has a content of impurities of 120 ppm or less, as the raw material for silicon carbide production.

[3] The method of producing the silicon carbide powder according the above-mentioned item [2], wherein the content of impurities in a heat generator formed of carbon, which is a heating means of the Acheson furnace, is equal to or less than the content of impurities in the raw material for silicon carbide production.

[4] The method of producing the silicon carbide powder according to the above-mentioned item [2] or [3], wherein the siliceous raw material is amorphous silica having a content of impurities of 50 ppm or less.

[5] The method of producing the silicon carbide powder according to any one of the above-mentioned items [2] to [4], wherein the carbonaceous raw material is carbon black having a content of impurities of 300 ppm or less.

[6] The method of producing the silicon carbide powder according to any one of the above-mentioned items [2] to [5], wherein the raw material for silicon carbide production has a pellet form.

Advantageous Effects of the Invention

The silicon carbide powder of the present invention has a high purity and can be manufactured at a low cost. The silicon carbide powder of the present invention can be used as raw materials of monocrystals for power semiconductors, jigs, and ceramic sintered materials used for applications requiring high purities.

The production method of the present invention allows for mass-production of a high-purity silicon carbide powder in a safe manner at a low cost.

EMBODIMENTS FOR CARRYING OUT THE INVENTION

Figure 1:
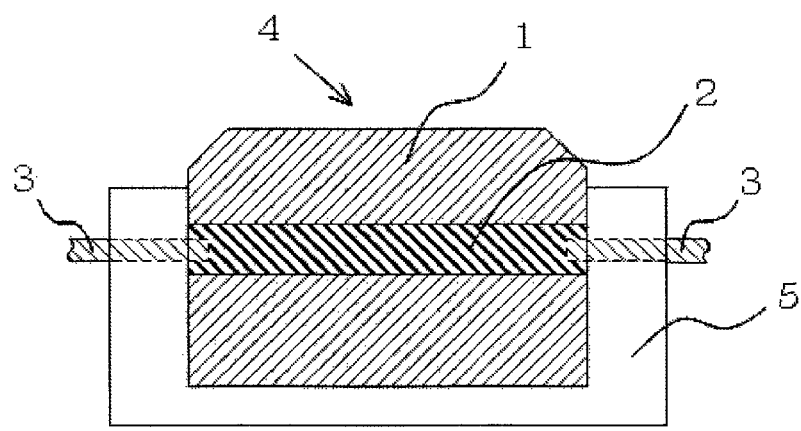
FIG. 1 is a cross-sectional view of an Acheson furnace in a longitudinal direction.

Hereinafter, the present invention will be described in detail.

A silicon carbide powder of the present invention is obtained by firing (i.e. heating), in an Acheson furnace, a raw material for silicon carbide production prepared by mixing a siliceous raw material and a carbonaceous raw material. In the silicon carbide powder, the content of impurities is 500 ppm or less, preferably 300 ppm or less, more preferably 200 ppm or less, still more preferably 150 ppm or less, far more preferably 100 ppm or less, and especially preferably 50 ppm or less. When the content exceeds 500 ppm, it is difficult to use the obtained silicon carbide powder as raw materials of monocrystals for power semiconductors, jigs, and ceramic sintered materials used for applications requiring high purities.

The impurities in the silicon carbide powder are components except for silicon (Si), carbon (C), oxygen (O), and nitrogen (N). Silicon (Si) and carbon (C) are components of silicon carbide itself and are not included in the impurities. Also, oxygen (O) and nitrogen (N) are not included in the impurities.

Examples of the impurities include boron (B), phosphorus (P), aluminum (Al), iron (Fe), titanium (Ti), nickel (Ni), copper (Cu), calcium (Ca), and zinc (Zn).

Especially, in the case of using the silicon carbide powder of the present invention as raw materials of monocrystals for power semiconductors, each of the contents of boron (B) and phosphorus (P) in the silicon carbide powder is preferably 1 ppm or less. Moreover, in this case, each of the contents of aluminum (Al), iron (Fe), and titanium (Ti) in the silicon carbide powder is preferably 100 ppm or less, more preferably 5 ppm or less, especially preferably 2 ppm or less.

The raw material for silicon carbide production used in the production method of the present invention contains a carbonaceous raw material and a siliceous raw material at a mixture mole ratio ($C/SiO_2$) of 2.5 to 4.0 and contains impurities at a content of 120 ppm or less.

In the present description, "mixture mole ratio ($C/SiO_2$) of carbonaceous raw material and siliceous raw material" means the ratio (i.e. $C/SiO_2$) of carbon (C) in the carbonaceous raw material to silicate ($SiO_2$) in the siliceous raw material in terms of mole in preparation of the raw material for silicon carbide production by mixing the carbonaceous raw material and the siliceous raw material.

The mixture mole ratio of the carbonaceous raw material and the siliceous raw material ranges from 2.5 to 4.0, preferably from 2.8 to 3.8, and more preferably from 3.0 to 3.6. When the mixture mole ratio is less than 2.5 or exceeds 4.0, the siliceous raw material and the carbonaceous raw material remains unreacted in large quantity in the product (i.e. silicon carbide powder). As just described, the mixture mole ratio has influence on the composition of the silicon carbide powder.

The content of impurities in the raw material for silicon carbide production is 120 ppm or less, preferably 100 ppm or less, more preferably 70 ppm or less, still more preferably 50 ppm or less, far more preferably 40 ppm or less, and especially preferably 20 ppm or less. When the content exceeds 120 ppm, it is difficult for the produced silicon carbide powder to have a purity usable as raw materials of monocrystals for power semiconductors.

The impurities in the raw material for silicon carbide production are the same as the impurities in the silicon carbide powder described above, and are components except for silicon (Si), carbon (C), oxygen (O), and nitrogen (N).

It is to be noted that most of oxygen (O) contained in the raw material for silicon carbide production is removed in the production process of the silicon carbide powder.

An example of the raw material for silicon carbide production used in the present invention is one prepared by mixing a siliceous raw material and a carbonaceous raw material by powder mixing to obtain a raw material mixture and then pelletizing the raw material mixture. Such raw material for silicon carbide production having a pellet form is obtained by, for example, pelletizing a mixture of silica and an organic resin.

The particle size (i.e. grain size) of the pellet (i.e. maximum size in a pellet; for example, the length of a major axis in the case where the cross section is an ellipse) is preferably 0.3 to 10 mm, more preferably 0.5 to 5 mm, and especially preferably 1 to 4 mm in view of handleability, efficiency of firing, and the like.

Examples of the siliceous raw material used in the production method of the present invention include natural silica sand, natural silica powders, artificial silica powders, silica fume, and amorphous silica. These can be used alone or in combination of two or more. In view of reactivity, amorphous silica is preferred.

The content of impurities in the siliceous raw material is preferably 50 ppm or less, and more preferably 25 ppm or less. When the content exceeds 50 ppm, the purity of the produced silicon carbide powder may be decreased.

The impurities in the siliceous raw material are the same as the impurities in the silicon carbide powder described above, and are components except for silicon (Si), carbon (C), oxygen (O), and nitrogen (N).

In the siliceous raw material, each of the contents of B, P, Al, Fe, Ca, and Ti is preferably 20 ppm or less, more preferably 10 ppm or less, still more preferably 5 ppm or less, and especially preferably 1 ppm or less.

The particle size of the siliceous raw material is preferably 10 mm or less, more preferably 8 mm or less, especially preferably 6 mm or less. When the particle size exceeds 10 mm, reactivity is significantly poor and productivity is decreased.

The definition of the particle size of the siliceous raw material is the same as that of the particle size of the pellet described above (i.e. maximum size).

Examples of the carbonaceous raw material used in the production method of the present invention include petroleum coke, coal pitch, carbon black, and organic resins. These can be used alone or in combination of two or more. Of these, in view of the purity, carbon black is preferred.

The content of impurities in the carbonaceous raw material is preferably 300 ppm or less, more preferably 200 ppm or less, still more preferably 100 ppm or less, and especially preferably 70 ppm or less. When the content exceeds 300 ppm, the purity of the obtained silicon carbide powder may be decreased.

The impurities in the carbonaceous raw material are the same as the impurities in the silicon carbide powder described above, and are components except for silicon (Si), carbon (C), oxygen (O), and nitrogen (N).

A heat generator (i.e. heating element or heating body) in an Acheson furnace used in the production method of the present invention is a heat generator which is formed of (i.e. made of) carbon and can conduct electricity. The type of the heat generator is not particularly limited, but examples of the heat generator include graphite powders and carbon rods.

It is preferred that the content of impurities in the heat generator is equal to or less than that in the raw material for silicon carbide production described above.

The impurities in the heat generator are the same as the impurities in the silicon carbide powder described above, and are components except for silicon (Si), carbon (C), oxygen (O), and nitrogen (N).

The content of the impurities in the heat generator is preferably 120 ppm or less, more preferably 70 ppm or less, still more preferably 50 ppm or less, and especially preferably 25 ppm or less. Setting the content of the impurities in the preferred range can provide a silicon carbide powder having a higher purity.

As the form of the heat generator, any one selected from powder form, rod form and the like can be employed as long as the heat generator can conduct electricity as described above. Furthermore, in the case where the heat generator is in rod form, the shape of the rod form is not particularly limited, and any shapes including cylindrical shapes and prismatic shapes can be employed.

An Acheson furnace used in the present invention will be described with reference to FIGS. 1 and 2.

Figure 2:
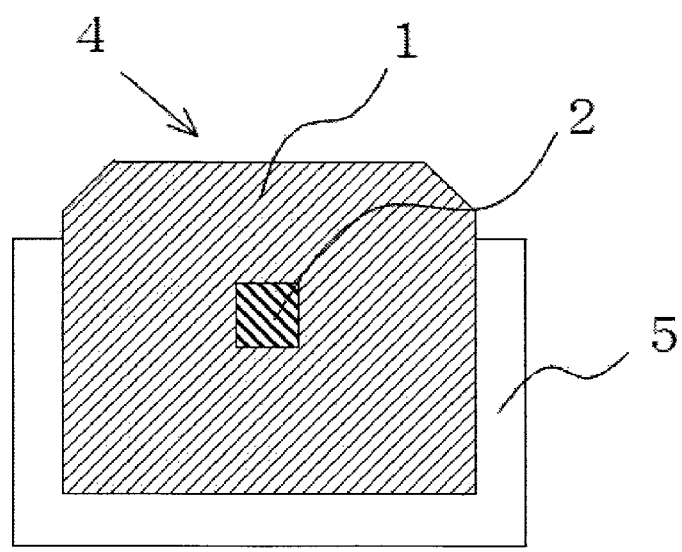
FIG. 2 is a cross-sectional view of the Acheson furnace in a direction perpendicular to the longitudinal direction.

FIG. 1 is a cross-sectional view of an Acheson furnace 4 in a longitudinal direction, and FIG. 2 is a cross-sectional view of the Acheson furnace 4 in a direction perpendicular to the longitudinal direction.

The Acheson furnace 4 is open to the atmosphere, and includes a furnace body 5 having a U-shape cross-section and electrode cores 3, 3 on both sides. A heat generator 2 is arranged in the central portion of the longitudinal direction so as to connect the electrode cores 3, 3, and the area around the heat generator 2 is filled with a raw material for silicon carbide production 1. The raw material for silicon carbide production 1 is contained in the interior space of the furnace body 5 in a semi-cylindrical shape.

When the heat generator 2 is heated by applying electrical current through the electrode cores 3, 3, a direct reduction reaction represented by the following formula (1) occurs around the heat generator 2, thereby lumps of silicon carbide (SiC) are generated.

$$SiO_2 + 3C \rightarrow SiC + 2CO \quad (1)$$

The reaction occurs at a temperature of 1600 to 3000° C.

The obtained lumps of silicon carbide are pulverized, thereby a high-purity silicon carbide powder is obtained.

Examples of the pulverizing means include general pulverizing means such as ball mills, vibration mills, and jet mills.

The obtained high-purity silicon carbide powder may be washed by a mineral acid depending on the intended purity. Examples of the mineral acid include hydrochloric acid, sulphuric acid, and nitric acid.

EXAMPLES

Hereinafter, the present invention will be described in more detail by way of Examples. However, it is to be noted that the present invention is not limited to those Examples.

1. Used Materials

The following materials were used.
(1) Siliceous raw material A; crystalline silica (manufactured by KCM Corporation, purified silica powder, particle size: 2 mm or less)
(2) Siliceous raw material B; amorphous silica (manufactured by TAIHEIYO CEMENT CORPORATION, trial product, particle size: 5 mm or less)
(3) Siliceous raw material C; crystalline silica (Australian natural silica powder, particle size: 2 mm or less)
(4) Carbonaceous raw material A; carbon black (manufactured by Cabot Corporation, product name "SHOBLACK 550", average particle size of primary particles: 50 nm, average particle size of secondary particles: 724 μm)
(5) Carbonaceous raw material B; carbon black (manufactured by Tokai Carbon Co., Ltd., product name "SEAST 600", average particle size of primary particles: 25 nm, average particle size of secondary particles: 500 μm)
(6) Carbonaceous raw material C; carbon black (manufactured by Tokai Carbon Co., Ltd., product name "SEAST TA", average particle size of primary particles: 120 nm, average particle size of secondary particles: 900 μm)
(7) Carbonaceous raw material D; carbon black (manufactured by AIR WATER INC., product name "SEAST TA", average particle size of primary particles: 20 nm, average particle size of secondary particles: 243 μm)
(8) Carbonaceous raw material E; Chinese oil coke, average particle size of secondary particles: 3,000 μm
(9) Raw material of heat generator; graphite powder for heat generator (trial product manufactured by TAIHEIYO CEMENT CORPORATION)
(10) Binding agent: polyvinyl alcohol (special grade item manufactured by KANTO CHEMICAL CO., INC.)

The following materials were prepared by using the above-described materials.
(11) Graphite A for heat generator; graphite A was obtained by firing the graphite powder for heat generator at 2,000° C. in a non-oxidizing atmosphere twice.
(12) Graphite B for heat generator; graphite B was obtained by firing the graphite powder for heat generator at 2,000° C. in a non-oxidizing atmosphere four times.
(13) Graphite C for heat generator; graphite C was obtained by firing the graphite powder for heat generator at 2,000° C. in a non-oxidizing atmosphere six times.

(14) Raw material mixture A having a pellet form; 47 mass parts (i.e. weight parts) of the siliceous raw material B and 52 mass parts of the carbonaceous raw material C were mixed, and then, 30 mass parts of a polyvinyl alcohol solution (20%) was added to 100 mass parts of the resultant raw material mixture having a powder form. The resultant was formed into pellets (particle size: 4 mm).

(15) Raw material mixture B having a pellet form; 62.5 mass parts of the siliceous raw material B and 37.5 mass parts of the carbonaceous raw material D was mixed, and then, polyvinyl alcohol was added thereto by the same manner as described above. The resultant was formed into pellets (particle size: 2 mm) by using a granulator.

The chemical components of the above-described materials were analyzed as follows. The results are shown in Table 1.

2. Analysis Method (1) Method of Analyzing the Contents of B (Boron) and P (Phosphorus)

ICP-AES analysis was conducted after alkali fusion, which is an analysis method of B (boron) in the soil (see BUNSEKI KAGAKU vol. 47, No. 7, pp. 451-454).

Specifically, 1 g a sample and 4 g of $Na_2CO_3$ was put into a platinum crucible, and then, the platinum crucible was placed in an electric furnace and heated at 700° C. for 1 hour. Next, the platinum crucible was heated at 800° C. for 4 hours with stirring the mixture in the platinum crucible every one hour, and then, was heated further at 1,000° C. for 15 minutes. After heating, 20 ml of HCl aqueous solution having a concentration of 50 mass % was added to the resultant mixture (i.e. fused mixture), followed by dissolution of the fused mixture at 140° C. for 10 minutes by using a hot plate while destroying the fused mixture. The resultant was diluted to 100 ml with water by using a measuring cylinder. Then, filtration was performed and ICP-AES was conducted for the obtained solid content. The obtained results are shown in Table 1.

(2) Method of Analyzing the Contents of Elements Except for B and P (i.e. Al, Fe, Ca, and Ti)

Each of the contents of Al, Fe, Ca, and Ti was measured by ICP-AES after acid decomposition under pressure specified in "JIS R 1616". The obtained results are shown in Table 1.

In each of the raw materials listed in Table 1, the total content of impurities except for the above six elements (B, P, Al, Fe, Ca, and Ti) was 10 ppm or less.

TABLE 1

| | | | Content (ppm) | | | | | | | Mixture mole ratio ($C/SiO_2$) |
|---|---|---|---|---|---|---|---|---|---|---|
| | | | B | P | Al | Fe | Ca | Ti | Total | |
| Crystalline silica A (purified silica powder) | Siliceous raw material | Siliceous raw material A | <1 | <1 | 7 | <1 | <1 | 3 | <14 | — |
| Amorphous silica A | | Siliceous raw material B | <1 | <1 | <1 | <1 | <1 | <1 | <6 | — |
| Crystalline silica B (natural silica powder) | | Siliceous raw material C | 3 | 2 | 260 | 75 | 20 | 115 | 475 | — |
| SHOBLACK | Carbonaceous raw material | Carbonaceous raw material A | <1 | <10 | 49 | 45 | 110 | 4 | <219 | — |
| SEAST 600 | | Carbonaceous raw material B | <1 | <10 | 43 | 34 | 34 | 2 | <124 | — |
| SEAST TA | | Carbonaceous raw material C | <0.5 | <5 | 8 | 18 | 32 | <1 | <65 | — |
| Bellfine | | Carbonaceous raw material D | 1 | 50 | 14 | 20 | 10 | 1 | 96 | — |
| Oil coke | | Carbonaceous raw material E | 1 | <5 | 50 | 150 | 550 | 110 | <866 | — |
| Graphite A | Heat generator | Graphite A for heat generator | 0.5 | <5 | 9 | 15 | 75 | 10 | <115 | — |
| Graphite B | | Graphite B for heat generator | <0.5 | <5 | <4 | 3 | 29 | 2 | <44 | — |
| Graphite C | | Graphite C for heat generator | <0.5 | <5 | <4 | 3 | 5 | 2 | <20 | — |
| Pellet A | Raw material mixture | Raw material mixture A having pellet form | 1 | 1 | 13 | 14 | 9 | 5 | 43 | 3.5 |
| Pellet B | | Raw material mixture B having pellet form | 1 | 1 | 9 | 10 | 9 | 5 | 35 | 3.3 |

Examples 1 to 8 and Comparative Examples 1 and 2

The raw material mixture, and graphite for heat generator shown in Table 2 were provided in the Acheson furnace shown in FIGS. 1 and 2, and then, heating was performed for 12 hours by applying electrical current at the maximum load of 70 kwh, thereby lumps of silicon carbide were produced. The resultant lumps of silicon carbide were pulverized by using a top grinder, and thus, a silicon carbide powder was obtained. The contents of the impurities (B, P, Al, Fe, Ca, and Ti) in the obtained silicon carbide powder were measured by the analysis methods described above. The results are shown in Table 3.

In Table 2, for each of "raw material mixture" and "heat generator", "content of impurities" means the total content of the six impurities described in Table 1.

Furthermore, in each of Examples 1 to 8 shown in Table 3, the total content of impurities except for the six impurities described in Table 3 was 10 ppm or less.

It is to be noted that the temperature in the Acheson furnace during heating was in the range of 1,600 to 3,000° C.

TABLE 2

| | Raw material mixture | | | | Heat generator | |
|---|---|---|---|---|---|---|
| | Siliceous raw material | Carbonaceous raw material | mixture mole ratio (C/SiO$_2$) | Content of impurities (ppm) | Type | Content of impurities (ppm) |
| Example 1 | Siliceous raw material A | Carbonaceous raw material A | 2.9 | 90 | Graphite A for heat generator | 115 |
| Example 2 | Siliceous raw material A | Carbonaceous raw material B | 3.5 | 60 | Graphite A for heat generator | 115 |
| Comparative Example 1 | Siliceous raw material C | Carbonaceous raw material B | 3.5 | 330 | Graphite A for heat generator | 115 |
| Example 3 | Siliceous raw material B | Carbonaceous raw material B | 3.1 | 51 | Graphite B for heat generator | 44 |
| Example 4 | Siliceous raw material B | Carbonaceous raw material C | 3.3 | 25 | Graphite C for heat generator | 20 |
| Example 5 | Siliceous raw material B | Carbonaceous raw material C | 3.5 | 20 | Graphite C for heat generator | 20 |
| Example 6 | Raw material mixture A having pellet form | | 3.5 | 43 | Graphite C for heat generator | 20 |
| Example 7 | Raw material mixture B having pellet form | | 3.3 | 35 | Graphite C for heat generator | 20 |
| Example 8 | Siliceous raw material B | Carbonaceous raw material B | 3.1 | 51 | Graphite A for heat generator | 115 |
| Comparative Example 2 | Siliceous raw material B | Carbonaceous raw material E | 3.3 | 350 | Graphite B for heat generator | 44 |

TABLE 3

| | Content of impurities in silicon carbide powder (ppm) | | | | | | Total content of six impurities (elements) shown in left columns (ppm) |
|---|---|---|---|---|---|---|---|
| | B | P | Al | Fe | Ca | Ti | |
| Example 1 | 1.5 | 15 | 12 | 35 | 90 | 30 | 184 |
| Example 2 | 1.5 | 15 | 8 | 4 | 20 | 15 | 64 |
| Comparative Example 1 | 18 | 20 | 310 | 400 | 150 | 40 | 938 |
| Example 3 | <0.1 | <0.1 | 19 | 3 | 18 | 78 | 118 |
| Example 4 | <0.1 | <0.1 | 4 | 3 | 10 | 2 | 19 |
| Example 5 | <0.1 | <0.1 | 0.8 | 1 | 9 | 1 | 12 |
| Example 6 | <0.1 | <0.1 | 3 | 4 | 17 | 1 | 25 |
| Example 7 | <0.1 | <0.1 | 2.5 | 2 | 11 | 2 | 18 |
| Example 8 | 2 | 10 | 13 | 8 | 40 | 15 | 88 |
| Comparative Example 2 | 2 | 5 | 40 | 140 | 400 | 80 | 667 |

REFERENCE SIGNS LIST

1 Mixture of siliceous raw material and carbonaceous raw material (Raw material for silicon carbide production)
2 Graphite for heat generator
3 Electrode core
4 Acheson furnace
5 Furnace body

The invention claimed is:

1. A method of producing silicon carbide powder, comprising:
   preparing a raw material mixture of a siliceous raw material and a carbonaceous raw material,
      the siliceous raw material is amorphous silica having a total content of impurities other than silicon, carbon, oxygen and nitrogen in an amount of 50 ppm or less,
      the carbonaceous raw material is carbon black having a total content of impurities other than silicon, carbon, oxygen and nitrogen in an amount of 300 ppm or less, and
      the raw a mixture containing the siliceous raw material and the carbonaceous raw material at a mixture mole ratio of carbon to silicon dioxide (C/SiO$_2$) from 2.5 to 4.0 and having a total content of impurities other than silicon, carbon, oxygen and nitrogen in an amount of 120 ppm or less;
   preparing an Acheson furnace including a step of combining a heat generator with the raw material mixture of a siliceous raw material and a carbonaceous raw material, heat generator being formed of carbon and having a total content of impurities other than silicon, carbon, oxygen and nitrogen in an amount of 12.0 ppm or less; and
   firing the raw material mixture in the Acheson furnace and forming a silicon carbide powder, the silicon carbide powder having a total content of impurities other than 1 silicon, carbon, oxygen and nitrogen in an amount of 300 ppm or less.

2. The method of producing the silicon carbide powder according to claim 1, wherein the total content of impurities other than silicon, carbon, oxygen and nitrogen in the heat generator is equal to or less than the total content of impurities other than silicon, carbon, oxygen and nitrogen in the raw material mixture.

3. The method of producing the silicon carbide powder according to claim 1, wherein the raw material for silicon carbide production has a pellet form.

4. The method of producing the silicon carbide powder according to claim 1, wherein the total content of the impurities other than silicon, carbon, oxygen and nitrogen includes amounts of boron, phosphorus, aluminum, iron, titanium, nickel, copper, calcium and zinc contained in the silicon carbide powder.

5. The method of producing the silicon carbide powder according to claim 1, wherein the total content of impurities other than silicon, carbon, oxygen and nitrogen contained in the silicon carbide powder is 100 ppm or less.

6. The method of producing silicon carbide powder according to claim 1, wherein the raw material mixture contains the siliceous raw material and the carbonaceous raw material at a mixture mole ratio of carbon to silicon dioxide (C/SiO$_2$) from 2.8 to 3.8.

7. The method of producing silicon carbide powder according to claim 1, wherein the raw material mixture contains the siliceous raw material and the carbonaceous raw material at a mixture mole ratio of carbon to silicon dioxide ($C/SiO_2$) from 3.0 to 3.6.

* * * * *